US012692193B2

(12) United States Patent
Khatri et al.

(10) Patent No.: US 12,692,193 B2
(45) Date of Patent: Jul. 28, 2026

(54) METHODS AND COMPOSITIONS FOR POLYMER CONCRETE AND POLYMER MORTAR

(71) Applicant: SAUDI ARABIAN OIL COMPANY, Dhahran (SA)

(72) Inventors: Waseem Ahmad Khatri, Dhahran (SA); Oscar Daniel Salazar Vidal, Dhahran (SA); Abiola Sunday Ojoas, Dhahran (SA); Mohammed Mehthel, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 616 days.

(21) Appl. No.: 18/314,974

(22) Filed: May 10, 2023

(65) Prior Publication Data

US 2024/0376007 A1    Nov. 14, 2024

(51) Int. Cl.
| | |
|---|---|
| *C04B 26/00* | (2006.01) |
| *C04B 16/04* | (2006.01) |
| *C04B 18/20* | (2006.01) |
| *C04B 20/00* | (2006.01) |
| *C04B 24/12* | (2006.01) |
| *C04B 24/26* | (2006.01) |
| *C04B 26/14* | (2006.01) |
| *C04B 103/14* | (2006.01) |
| *C04B 103/56* | (2006.01) |

(52) U.S. Cl.
CPC .............. *C04B 26/14* (2013.01); *C04B 16/04* (2013.01); *C04B 18/20* (2013.01); *C04B 20/0076* (2013.01); *C04B 24/121* (2013.01); *C04B 24/2641* (2013.01); *C04B 2103/14* (2013.01); *C04B 2103/58* (2013.01); *C04B 2201/20* (2013.01); *C04B 2201/52* (2013.01)

(58) Field of Classification Search
CPC ......... C04B 26/14; C04B 16/04; C04B 18/20; C04B 20/0076; C04B 24/121; C04B 24/2641; C04B 2103/14; C04B 2103/58; C04B 2201/20; C04B 2201/52
USPC .................................................. 106/287.22
See application file for complete search history.

(56) References Cited

U.S. PATENT DOCUMENTS

| | | | |
|---|---|---|---|
| 4,120,832 | A | 10/1978 | Ceintrey |
| 4,331,726 | A | 5/1982 | Cleary |
| 6,034,155 | A | 3/2000 | Espeland et al. |
| 8,652,251 | B2 | 2/2014 | Al-Mehthel et al. |
| 9,181,663 | B2 | 11/2015 | Brien |
| 9,919,452 | B2 | 3/2018 | Alsewailem |
| 10,294,155 | B2 | 5/2019 | Alqahtani |
| 10,308,553 | B2 | 6/2019 | Maslehuddin et al. |
| 10,494,301 | B2 | 12/2019 | Maslehuddin et al. |
| 10,494,302 | B1 | 12/2019 | Brahim et al. |
| 10,669,201 | B2 | 6/2020 | Ali et al. |
| 10,865,143 | B2 | 12/2020 | Ali et al. |
| 11,124,451 | B2 | 9/2021 | Ali et al. |
| 2008/0153942 | A1 | 6/2008 | Juarez |
| 2020/0071450 | A1 | 3/2020 | Zielinski |
| 2021/0061710 | A1 | 3/2021 | Giles |
| 2022/0056233 | A1 | 2/2022 | Wagle et al. |
| 2022/0242785 | A1* | 8/2022 | Ostvik ............... C04B 40/0028 |

FOREIGN PATENT DOCUMENTS

| | | | | |
|---|---|---|---|---|
| CN | 104446144 | A | 3/2015 | |
| CN | 110746140 | A * | 2/2020 | ........... C04B 26/105 |
| DE | 102012113000 | A1 | 6/2014 | |
| EP | 2619400 | B1 | 7/2013 | |
| EP | 3743399 | B1 | 12/2020 | |
| JP | H0867542 | A * | 3/1996 | ............. C04B 28/02 |
| SU | 1553550 | A * | 3/1990 | |
| WO | 2010030048 | A1 | 3/2010 | |

OTHER PUBLICATIONS

Written Opinion and International Search Report from corresponding PCT Application No. PCT/US2024/028925 mailed Aug. 26, 2024.

* cited by examiner

*Primary Examiner* — James E Mcdonough
(74) *Attorney, Agent, or Firm* — Vorys, Sater, Seymour and Pease LLP

(57)    ABSTRACT

Polymer concrete and polymer mortar compositions and related methods of producing the same are disclosed. The compositions and methods produce economical, ready-mixed polymer concrete(s) and mortar(s) using a combination of thermoset polymers and emulsified polymers, hardeners, coarse and/or fine aggregates, fillers, shrinkage control agents, and other additives. The polymer concrete and polymer mortars utilize recycled materials.

19 Claims, No Drawings

METHODS AND COMPOSITIONS FOR POLYMER CONCRETE AND POLYMER MORTAR

FIELD OF THE DISCLOSURE

The present disclosure relates generally to polymer concrete and polymer mortar compositions, and related methods.

BACKGROUND OF THE DISCLOSURE

Concrete is an extensively used construction material. However, concrete on its own may not be suitable for most construction projects. Although concrete has excellent resistance to compression, its tensile strength can be poor. Thus, concrete is prone to cracking under tensile stress, which can lead to structural failure.

Polymer concrete and polymer mortar are commonly used construction materials as alternatives to traditional concrete and concrete mortar, such as for use in various industries including, among many others, the oil and gas industry, transportation industry, and building and structure construction industry. Polymer concrete and mortar are composite compositions that utilize polymers to replace lime-type cements as a binder. In comparison to traditional concrete and mortar, polymer concrete and mortar provide a number of advantages including, for example, improved tensile strength, adhesion, water tightness, chemical resistance, and abrasion resistance. Polymer concrete and mortar comprise aggregates that form a strong bond with the polymeric binder(s), thus the strength of polymer concrete and mortar is dependent upon the type, size, and concentration of such aggregates.

Despite their improvement over traditional concrete and mortar, currently available polymer concrete and mortar can suffer a number of disadvantages. Such disadvantages can include poor thermal and fire resistance, large mechanical property dependence upon temperature, high costs associated with the material and manufacturing techniques of polymer concrete and mortar (e.g., current polymer concrete and mortar must be mixed at the final location of construction.

Despite their improvement over traditional concrete and mortar, currently available polymer concrete and mortar can suffer a number of disadvantages. Such disadvantages can include poor thermal and fire resistance, large mechanical property dependence upon temperature, high costs associated with the material and manufacturing techniques of polymer concrete and mortar. For example, current polymer concrete and mortar must be mixed at the final location of construction or to target precast members, which requires specialized equipment and significant working space footprint.

There is a need for a polymer concrete and mortar that exhibits compressive and tensile strength, and overcomes the aforementioned disadvantages of current polymer concrete and mortar.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a polymer concrete composition is provided including a thermoset polymer in an amount in the range of about 0.1% to about 10% by total mass of the polymer concrete composition; a supplemental polymer in an amount in the range of about 0.1% to about 5% by total mass of the polymer concrete composition, wherein the supplemental polymer is a water-based surface-stabilized styrene-butadiene copolymer or a water-based styrene-butadiene copolymer; coarse aggregates in an amount in the range of about 50% to about 75% by total mass of the polymer concrete composition; fine aggregates in an amount in the range of about 10% to about 40% by total mass of the polymer concrete composition; recycled plastic filler material in an amount in the range of about 0.1% to about 10% by total mass of the polymer concrete composition, wherein the recycled plastic filler material is selected from the group consisting of recycled polyethylene, recycled polycarbonate, and any combination thereof; a shrinkage control agent in an amount in the range of about 0.1% to about 1% by total mass of the polymer concrete composition; and a hardener in an amount in the range of about 50% to about 75% by total mass of the polymer concrete composition.

In another embodiment consistent with the present disclosure, a method is provided including mixing a ready-mixed polymer concrete composition comprising: a thermoset polymer in an amount in the range of about 0.1% to about 10% by total mass of the polymer concrete composition; a supplemental polymer in an amount in the range of about 0.1% to about 5% by total mass of the polymer concrete composition, wherein the supplemental polymer is a water-based surface-stabilized styrene-butadiene copolymer or a water-based styrene-butadiene copolymer; coarse aggregates in an amount in the range of about 50% to about 75% by total mass of the polymer concrete composition; fine aggregates in an amount in the range of about 10% to about 40% by total mass of the polymer concrete composition; recycled plastic filler material in an amount in the range of about 0.1% to about 10% by total mass of the polymer concrete composition, wherein the recycled plastic filler material is selected from the group consisting of recycled polyethylene, recycled polycarbonate, and any combination thereof; a shrinkage control agent in an amount in the range of about 0.1% to about 1% by total mass of the polymer concrete composition; and curing the ready-mixed polymer concrete composition by adding a hardener in an amount in the range of about 50% to about 75% by total mass of the polymer concrete composition.

In a further embodiment consistent with the present disclosure, a polymer mortar composition is provided including a thermoset polymer in an amount in the range of about 0.1% to about 10% by total mass of the polymer mortar composition; a supplemental polymer in an amount in the range of about 0.1% to about 5% by total mass of the polymer mortar composition, wherein the supplemental polymer is a water-based surface-stabilized styrene-butadiene copolymer or a water-based styrene-butadiene copolymer; fine aggregates in an amount in the range of about 10% to about 40% by total mass of the polymer mortar composition; recycled plastic filler material in an amount in the range of about 0.1% to about 10% by total mass of the polymer mortar composition, wherein the recycled plastic filler material is selected from the group consisting of recycled polyethylene, recycled polycarbonate, and any combination thereof; a shrinkage control agent in an amount in the range of about 0.1% to about 1% by total mass of the polymer mortar composition; and a hardener in an amount in the range of about 50% to about 75% by total mass of the polymer mortar composition.

In yet a further embodiment consistent with the present disclosure, a method is provided including mixing a ready-mixed polymer mortar composition comprising: a thermoset polymer in an amount in the range of about 0.1% to about 10% by total mass of the polymer mortar composition; a supplemental polymer in an amount in the range of about 0.1% to about 5% by total mass of the polymer mortar composition, wherein the supplemental polymer is a water-based surface-stabilized styrene-butadiene copolymer or a water-based styrene-butadiene copolymer; fine aggregates in an amount in the range of about 10% to about 40% by total mass of the polymer mortar composition; recycled plastic filler material in an amount in the range of about 0.1% to about 10% by total mass of the polymer mortar composition, wherein the recycled plastic filler material is selected from the group consisting of recycled polyethylene, recycled polycarbonate, and any combination thereof; and a shrinkage control agent in an amount in the range of about 0.1% to about 1% by total mass of the polymer mortar composition; and curing the ready-mixed polymer mortar composition by adding a hardener in an amount in the range of about 50% to about 75% by total mass of the polymer mortar composition.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

In the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description.

Embodiments in accordance with the present disclosure generally relate to polymer concrete and polymer mortar compositions, and related methods. More particularly, the present disclosure relates to compositions and methods of producing economical, ready-mixed polymer concrete(s) and mortar(s) using a combination of thermoset polymers and emulsified polymers, hardeners, coarse and/or fine aggregates, fillers, shrinkage control agents, and other additives. Cement may be included in the polymer concrete and mortar compositions of the present disclosure, but if it is included, it is generally in low concentration (i.e., 0.1 wt. % to 10 wt. %) and serves to hydrate with water that does not evaporate.

The economical, ready-mixed polymer concrete and mortar described herein is manufactured in batch according to specific use (or job) requirements and delivered to a use (or job) site "ready to use." The polymer concrete and mortar of the present disclosure is delivered in a dry state and hardened on site.

The polymer concrete and mortar compositions of the present disclosure may advantageously use industrial byproducts, thereby being environmentally friendly and using elements that would otherwise be considered disposable waste. Such industrial byproducts may include, but are not limited to, recycled plastic, rubber, construction waste, fly ash, oil ash, silica fume, steel byproduct, black carbon, cement waste, and the like, and any combination thereof. Such byproducts may replace a portion or all of the aggregates (fine and/or coarse) used for production of traditional polymer cement and mortar.

The polymer concrete and mortar compositions of the present disclosure may be used for precast or cast-in-place (i.e., cast in situ) structural or non-structural elements. Such elements may include, but are not limited to, precast products such as pipelines, manholes, handholes, electric poles, cellars, tunnel liners, pilings, building frames, gutters, footpath panels, and the like, and any combination thereof; cast-in-place products may include, but are not limited to, overlays for pavement or concrete structural repairs, spillway coverings, drainage pavements, erosion liners, pavement patches, and the like, and any combination thereof.

The polymer concrete and mortar compositions of the present disclosure may be reinforced or unreinforced. Reinforcement may be effectuated with steel bars (e.g., rebar) or fibers (e.g., fiberglass). In one or more aspects, fiberglass reinforced plastic rebar may be used in monolithic castings using the polymer concrete and/or mortar compositions of the present disclosure.

Additives may be added to the polymer concrete and mortar compositions of the present disclosure to impart desirable characteristics, such as based on a particular application, as described herein. For example, a fire retardant additive may be included in the polymer concrete and mortar compositions to ensure that structural and non-structural elements maintain integrity and are not compromised in the event of contact with fire.

In one or more aspects of the present disclosure, the polymer concrete and mortar compositions described herein may utilize the combination of an emulsified (in an aqueous fluid) polymer and delayed introduction of a hardener, resulting in a workable mixture and enabling utilization of currently available equipment used for traditional ready-mixed concrete and mortar, permitting delivery of the polymer concrete and mortar described herein to its final application before it hardens. That is, the hardener may be added to a polymer concrete and/or mortar mixture at site (i.e., where the concrete and/or mortar is to be used), thereby allowing for a ready-mixed polymer concrete and/or mortar, as described herein.

In one or more aspects, the economical, ready-mixed polymer concrete of the present disclosure may include coarse aggregates; fine aggregates; thermoset polymer; optional supplemental polymer, such as water-based-surface-stabilized styrene-butadiene copolymer and/or water-based styrene-acrylate; shrinkage control agent; hardener; and optional filler material. Other additives may additionally be included as described herein.

In one or more aspects, the economical, ready-mixed polymer mortar of the present disclosure may include fine aggregates; thermoset polymer; optional supplemental polymer, such as water-based surface-stabilized styrene-butadiene copolymer and/or water-based styrene-acrylate; shrinkage control agent; hardener; and optional filler material. Other additives may additionally be included as described herein.

The composition of the overlapping materials between the polymer concrete and polymer mortar (i.e., all but the coarse aggregates of the polymer concrete) may be comprised of the same or different materials, without departing from the scope of the present disclosure.

The polymer concrete compositions of the present disclosure may exhibit certain physical properties including compressive strength, linear drying shrinkage according to ASTM C426 (2022), and density.

In one or more aspects, the compressive strength of the polymer concrete and mortar compositions may be at least about 3,000 pounds per square inch (PSI), such as in the range of about 3,000 PSI to about 16,000 PSI, encompassing any value and subset therebetween, such as about 3,000 PSI to about 7,000 PSI, or about 7,000 PSI to about 11,000 PSI, or about 11,000 PSI to about 16,000 PSI.

The linear drying shrinkage of the polymer cement and mortar compositions may be less than about 0.065%, such as in the range of about 0.01% to about 0.065%, encompassing any value and subset therebetween, such as 0.01% to 0.025%, or about 0.025% to about 0.05%, or about 0.05% to about 0.65%.

The average density of the polymer cement and mortar compositions may be at least about 2,000 kilograms per cubic meter (kg/m$^3$), such as in the range of about 2,000 kg/m$^3$ to about 4,000 kg/m$^3$, encompassing any value and subset therebetween, such as about 2,000 kg/m$^3$ to about 3,000 kg/m$^3$, or about 3,000 kg/m$^3$ to about 4,000 kg/m$^3$.

Aggregates may be included in the polymer concrete and mortar compositions of the present disclosure to bond with the thermoset polymer and supplemental polymer (if included). The aggregates are fine or course in size. The aggregates are generally inert in nature and dispersed throughout the polymer concrete or mortar compositions. Typically, the polymer concrete compositions comprise both coarse and fine aggregates and the polymer mortar comprises fine aggregates. Aggregates are solid and free from dust or organic materials. The compositions of the aggregates may include, but are not limited to, mineral aggregates, such as sand, dune sand, river sand, quarry dust, crushed quarry rock, gravel, silica, gravel, limestone, calcium carbonate, cinder, calcareous rock, granite, clay, quartz, stone, sand, phosphorous gypsum, and any combination thereof.

In some embodiments, the aggregates comprise sand or dune sand (i.e., a wind-deposited sandy material). When used as aggregates, they may be relatively single-sized particles that are graded such that the aggregates pass the No. 16 sieve (1.18 mm) and usually contain less than about 10% of particles passing the No. 200 sieve (0.074 mm). The sand or dune sand aggregates may be tested to specification per ASTM D422 (2017) and ASTM C33 (2018).

Typically, the polymer concrete and mortar compositions have coarse aggregates in a concentration in the range of about 50% to about 75% by total mass of the polymer concrete, encompassing any value and subset therebetween, such as 50% to about 60%, or about 60% to about 75% by total mass of the polymer concrete. The polymer concrete additionally comprises fine aggregates in a concentration in the range of about 10% to about 40% by total mass of the polymer concrete, encompassing any value and subset therebetween, such as 10% to about 25%, or about 25% to about 40% by total mass of the polymer concrete. Typically, the polymer mortar has fine aggregates in a concentration in the range of about 10% to about 40% by total mass of the polymer mortar, encompassing any value and subset there between, such as 10% to about 25%, or about 25% to about 40% by total mass of the polymer concrete.

The size of the fine aggregates may have an average diameter in the range of about 1 millimeters (mm) to about 5 mm, encompassing any value and subset therebetween; the size of the coarse aggregates may have an average diameter in the range of greater than about 5 mm to about 40 mm, such as about 5 mm to about 20 mm, encompassing any value and subset therebetween. The fine aggregates comply with ASTM C33 (2018).

In one or more aspects, a portion or all of the fine and/or coarse aggregates may be replaced with filler materials including, but not limited to, plastic (virgin), recycled plastic, recycled rubber (e.g., wire cords from tires, ground rubber particles), construction waste, demolition waste, ash (e.g., fly ash from coal or oil ash from burning fuel having a carbon content greater than about 80 wt %), silica fume, steel byproduct, carbon black, cement, cement waste, polypropylene fibers, polyethylene fibers, nylon, marl, industrial waste (e.g., waste from steel, aluminum, and cement industries, such as bag house dust, pulverized slag, cement kiln dust, red mud, and the like), natural pozzolanic material meeting ASTM 618 (2022), and any combination thereof. The recycled plastic filler material may include thermoplastic, such as wax, low-density polyethyene, liner medium-density polyethylene, high-density polyethylene, polypropylene, polycarbonate (e.g., from electronic waste), and the like, and any combination thereof, or recycled thermoset composites. Such filler materials may capitalize on sustainability, particularly when recycled filler materials are used.

Construction or demolition waste filler material for use in the polymer concrete and mortar of the present disclosure may include concrete from such sources that may be crushed, sieved, and segregated. When used as forming a portion of the coarse aggregates, such material may be sieved such that the filler material generally pass a 37.5 mm sieve and are retained in a 12.5 mm sieve. The construction or demolition waste may be tested to specification per ASTM C33 (2018).

Marl filler material for use in the polymer concrete and mortar of the present disclosure may include calcareous soil materials obtained in Saudi Arabia which may vary from clay to gravel average diameters and often includes cobble and boulder sized pieces. Such marl filler material is be free of frozen lumps, organic matter, trash, chunks of highly plastic clay (classified as CH as determined by ASTM D2487 (2018)), or other unsatisfactory material. The maximum size of the Marl filler material may be the maximum gradation size limit as per ASTM C33 (2018).

Plastic filler material for use in the polymer concrete and mortar of the present disclosure may be virgin or recycled plastic or combination of virgin and recycled polyethylene, such as low-density polyethylene, medium low-density polyethylene, and/or high-density polyethylene; virgin or recycled polycarbonate; and/or nylon. These plastic filler materials may be in the form of fibers having a length in the range of about 10 mm to about 20 mm, encompassing any value and subset therebetween, such as about 10 mm to about 15 mm, or about 15 mm to about 20 mm.

The melting points of the ethylene-based plastic filler materials may be in the range of about 110° C. to about 170° C., encompassing any value and subset therebetween, such as about 110° C. to about 120° C., or about 120° C. to about 130° C., or about 130° C. to about 140° C., or 140° C. to about 150°, or about 150° C. to about 160° C., or about 160° C. to about 170° C. The specific density of the ethylene-based plastic filler materials may be in the range of about 0.91 g/cm$^3$ to about 0.965 g/cm$^3$ as determined by ASTM D792 (2020), encompassing any value and subset therebetween, such as about 0.91 g/cm$^3$ to about 0.93 g/cm$^3$, or about 0.93 g/cm$^3$, or about 0.93 g/cm$^3$ to about 0.965 g/cm$^3$. The melt flow rate of the ethylene-based plastic filler materials may be in the range of about 0.20 g/10 min to about 0.5 g/10 min as determined by ASTM D1238 (2023), encompassing any value and subset therebetween, such as about 0.20 g/10 min to about 0.3 g/10 min, or about 0.3 g/10 min to about 0.4 g/10 min, or about 0.4 g/10 min to about 0.5 g/10 min.

In one or more instances, at least a portion of the fine and/or coarse aggregates comprises recycled plastic filler material of polycarbonate (e.g., from electronic waste). Such recycled polycarbonate may exhibit the following properties, as shown in Table 1:

TABLE 1

| Property | Values |
|---|---|
| Specific Gravity | 1.2 g/cm² at 25° C. |
| Water Absorption | 0.15% |
| Light Transmission, Clear @ 0.118% | 86% |
| Compressive Strength | 86.1 MPa |
| Flexural Strength | 93 MPa |
| Tensile Strength Ultimate | 65.5 MPa |
| Tensile Modulus | 2378.5 MPa |
| Izod Impact Strength | 6.4-8.5 J/cm |
| Rockwell Hardness | 118 M70/R |
| Elongation | 110% |

The filler material may be present in the polymer concrete or polymer mortar in an amount in the range of about 0.1% to about 10% by total mass of the polymer concrete or polymer mortar, encompassing any value and subset therebetween, such as about 0.1% to about 1%, or about 1% to about 5%, or about 5% to about 10%. When included, the recycled filler material may be present in the polymer concrete or polymer mortar in an amount in the range of about 0% to about 5% by total mass of the polymer concrete or polymer mortar, encompassing any value and subset therebetween, such as about 1% to about 2.5%, or about 2.5% to about 5%.

The thermoset polymer may be included in the polymer concrete and mortar compositions of the present disclosure, and may be added as a full replacement to cement, and act as a binder to impart high thermal stability. Thermoset polymers are highly crosslinked polymers that cannot be melted once formed, as the internal portions of their structure are not capable of moving freely relative to each other due to gelation. The thermoset polymer(s) may, in addition to thermal stability, exhibit strong adhesion to most building materials, low shrinkage, high chemical resistance, good creep and fatigue resistance, and low water absorption. In one or more aspects, the thermoset polymer may be an epoxy resin, a vinyl ester, a polyester, a furan polymer, and any combination thereof. In some embodiments, the thermoset polymer, alone or in combination with other thermoset polymers, may be a furan polymer crosslinked with furfuryl alcohol, furfuraldehyde, or formaldehyde to yield the thermoset polymer.

In some embodiments, the thermoset polymer, alone or in combination with other thermoset polymers, is an epoxy resin based on bisphenol A. Such epoxy resin based on bisphenol A may exhibit the following properties, as shown in Table 2:

TABLE 2

| Property | Values |
|---|---|
| Wet density | 130 lbs./ft3 to 150 lbs./ft3 |
| Pot Life (subject to mixing the hardener) | 60 minutes at 50° F. after introducing hardener |
| | 40 minutes at 77° F. after introducing hardener |
| Initial Set | 8-10 hours at 50° F. |
| | 4-6 hours 77° F. |
| Absorption (ASTM C-413 (2018)) | 0.08% maximum |
| Shrinkage | <0.05% maximum |

In one or more aspects, the thermoset polymer may be present in the polymer concrete or polymer mortar in an amount in the range of about 0.1% to about 10% by total mass of the polymer concrete or polymer mortar, encompassing any value and subset therebetween, such as about 0.1% to about 1%, or about 1% to about 5%, or about 5% to about 10%.

Thermoset polymers, such as epoxy resins, can be relatively expensive. Accordingly, additional polymers, such as thermoplastic polymers, may be used to supplement the thermoset polymer and reduce the cost of the resultant polymer concrete and/or mortar, and in some instances improve workability. Such supplemental polymers may include, but are not limited to, a surface-stabilized styrene-butadiene copolymer latex, a styrene-acrylate copolymer, and any combination thereof. Such surface-stabilized styrene-butadiene copolymer latex and/or styrene-acrylate copolymer are water-based for use in the polymer concrete and mortar of the present disclosure. For example, in some embodiments, the styrene-acrylate supplemental polymer may be an emulsion in 50% solid (polymer) ratio with a water to polymer ratio of 1:1.

In one or more aspects, the supplemental polymer may be present in an amount in the range of about 0.1% to about 5% by total mass of the polymer concrete or polymer mortar, encompassing any value and subset therebetween, such as about 0.1% to about 1%, or about 1% to about 5%. In other aspects, the supplemental polymer may be omitted from the polymer concrete or mortar compositions described herein.

One or more shrinkage control agents are included in the polymer concrete and mortar compositions of the present disclosure to prevent shrinkage during curing (i.e., to have controlled volumetric change) and cracking. The shrinkage control agent(s) is selected to be compatible with the thermoset polymer and supplemental polymer (if present). Examples of suitable shrinkage control agents include, but are not limited to, monomers and polymers, such as methyl methacrylate polymers, polyalkyl methacrylate polymers (e.g., polymerization of methyl methacrylate, isobutyl methacrylate, 2-ethylhexyl acrylate, and the like), saturated aliphatic polyesters (e.g., polyneopentyl adipate, polypropylene adipate, poly ε-caprolactone, and the like), and any combination thereof.

In preferred embodiments, the shrinkage control agent is methyl methacrylate polymer. Such methyl methacrylate polymer may exhibit the following properties, as shown in Table 3:

TABLE 3

| Property | Values |
|---|---|
| Specific Gravity | 0.943 g/cm2 at 25° C. |
| Viscosity | 0.56 MPa at 20° C. |
| Molecular Weight | 100.12 g/mol |

In one or more aspects, the shrinkage control agent may be present in an amount in the range of about 0.1% to about 1% by total mass of the polymer concrete or polymer mortar, encompassing any value and subset therebetween, such as about 0.1% to about 0.5%, or about 0.5% to about 1%.

A hardener(s) (or hardening agent) may be included in the polymer concrete and mortar compositions of the present disclosure and acts as a strong adhesive and curing agent, which further may increase the resilience or strength of the polymer concrete and mortar once cured (set). In some instances, the hardener may act as a curing accelerant. When the polymer concrete or mortar is used for pavements or pavement repair, for example, the hardener may further prevent curling (i.e., distortion into a curved shape by upward or downward bending). As described herein, the hardener may be added to a mixture of the components of a polymer concrete or mortar composition of the present disclosure at the site (or job) location.

The hardener for use in the polymer concrete and mortar compositions of the present disclosure may include an amine-based compound, a polymercaptan compound, a polyamide compound, an amidoamine compound, a phenalkamine compound, and any combination thereof. In one or more aspects, the hardener may be present in an amount in the range of about 10 wt % to about 100 wt % of the thermoset polymer and supplemental polymer combined, encompassing any value and subset therebetween.

In particular embodiments, the hardener is an amine-based compound. The amine-based compounds for use as the hardener in the polymer concrete and mortar compositions of the present disclosure may be aliphatic amine-based compounds, cycloaliphatic amine-based compounds, aromatic amine-based compounds, and any combination thereof.

Aliphatic amine-based compounds, unmodified or modified, may provide rapid hardening or curing at ambient temperatures. Examples of suitable aliphatic amine-based compounds may include, but are not limited to, diethylenetriamine (DETA), triethylenetetramine (TETA), tetraethylenepentamine (TEPA), diproprenediamine (DPDA), diethylaminopropylamine (DEAPA), and any combination thereof. In particular embodiments, the hardener is TETA (i.e., tetra-amine 3-ethylene).

Cycloaliphatic amine-based compounds, unmodified or modified, may impart improvements in chemical resistance and glass transition temperatures. Examples of suitable cycloaliphatic amine-based compounds may include, but are not limited to, N-aminoethylpiperazine (N-AEP), methane diamine (MDA), m-xylylenediamine (MXDA), and any combination thereof.

Aromatic amine-based compounds, unmodified or modified, may lead to high glass transition temperatures and chemical resistance. Examples of suitable aromatic amine-based compounds may include, but are not limited to, dimethylaniline (DMA), metaphenylene diamine (MPDA), diaminodiphenylmethane (DDM), diaminodiphenylsulfone (DDS), and any combination thereof.

In some embodiments, the hardener is dimethylaniline (DMA). Such DMA may exhibit the following properties, as shown in Table 4:

TABLE 4

| Property | Values |
|---|---|
| Specific Gravity | 0.942 g/cm² at 25° C. |
| Boiling Point | 193-194° C. |

TABLE 4-continued

| Property | Values |
|---|---|
| Melting Point | 1.5-2.5° C. |
| Molecular Weight | 121.8 g/mol |

In one or more aspects, the hardener may be present in an amount in the range of about 0.1% to about 1% by total mass of the polymer concrete or polymer mortar, encompassing any value and subset therebetween, such as about 0.1% to about 0.5%, or about 0.5% to about 1%.

Optional additives may be included in the polymer concrete and mortar of the present disclosure, including fire retardant agents, such as polymeric fire resistant agents (e.g., polysulfones, polyphenylene sulfide, polyetherketones, fluoropolymers), carbide derivatives (virgin and/or recycled), ammonium polyphosphate, melamine polyphosphate, and any combination thereof. Fire retardants may be included to comply with ASTM E119: Standard Test Methods for Fire Tests of Building Construction and Materials (2022).

In one or more aspects, when included, the additives may be present in an amount in the range of about 2% to about 5% by total mass of the polymer concrete or polymer mortar, encompassing any value and subset therebetween, such as about 2% to about 3%, or about 3% to about 4%, or about 4% to about 5%.

In one or more embodiments of the present disclosure, a method of preparing the polymer concrete includes preparing a blend comprising at least coarse aggregates, fine aggregates, thermoset polymer(s), shrinkage control agent(s), and hardener. Optional filler materials, additives, and supplemental polymers, such as water-based surface-stabilized styrene-butadiene copolymer and/or water-based styrene-acrylate, may additionally be included in the blend as described below.

In one or more embodiments of the present disclosure, a method of preparing the polymer mortar includes preparing a blend comprising at least fine aggregates, thermoset polymer(s), shrinkage control agent(s), and hardener. Optional filler materials, additives, and supplemental polymers, such as water-based surface-stabilized styrene-butadiene copolymer and/or water-based styrene-acrylate, may additionally be included in the blend as described below.

The method of preparing the polymer concrete and polymer mortar may include blending in a controlled environment by first mixing the aggregates (coarse and fine aggregates for the polymer concrete and only fine aggregates for the polymer mortar); followed by adding and mixing any filler materials; followed by adding and mixing any supplemental polymer(s); followed by adding and mixing the thermoset polymer(s), shrinkage control agent(s), and optional additives (e.g., fire retardant agent). The polymer concrete and mortar is transported to its final application and prior to introducing the blend to the application, hardener is added and mixed with the blend. The polymer concrete and mortar is allowed to cure without water for a period of time (e.g., 2 hours) at atmospheric conditions.

In a particular example, the method of preparing the polymer concrete and polymer mortar may include blending in a controlled environment at ambient temperature (~20° C.) by first mixing the aggregates (coarse and fine aggregates for the polymer concrete and only fine aggregates for the polymer mortar) for 30 seconds; followed by adding and mixing non-recycled filler materials for 30 seconds; followed by adding and mixing recycled filler materials (e.g., 5-20 mm recycled plastic fibers) for 30 seconds; followed by adding and mixing supplemental polymer for 30-60 seconds; followed by adding and mixing the thermoset polymer(s), shrinkage control agent(s), and optional additives (e.g., fire retardant agent) for 30-60 seconds. The polymer concrete and mortar is transported to its final application and prior to introducing the blend to the application, hardener is added and mixed with the blend for 30-60 seconds. The polymer concrete and mortar is allowed to cure without water for 2 hours at atmospheric conditions.

Accordingly, the present disclosure provides an economical, ready-mixed polymer concrete and mortar that may be manufactured in batch according to specific use (or job) requirements and delivered to a use (or job) site "ready to use." The polymer concrete and mortar of the present disclosure is delivered in a dry state and hardened on site.

Embodiments disclosed herein include:

Embodiment A: A polymer concrete composition comprising: a thermoset polymer in an amount in the range of about 0.1% to about 10% by total mass of the polymer concrete composition; a supplemental polymer in an amount in the range of about 0.1% to about 5% by total mass of the polymer concrete composition, wherein the supplemental polymer is a water-based surface-stabilized styrene-butadiene copolymer or a water-based styrene-butadiene copolymer; coarse aggregates in an amount in the range of about 50% to about 75% by total mass of the polymer concrete composition; fine aggregates in an amount in the range of about 10% to about 40% by total mass of the polymer concrete composition; recycled plastic filler material in an amount in the range of about 0.1% to about 10% by total mass of the polymer concrete composition, wherein the recycled plastic filler material is selected from the group consisting of recycled polyethylene, recycled polycarbonate, and any combination thereof; a shrinkage control agent in an amount in the range of about 0.1% to about 1% by total mass of the polymer concrete composition; and a hardener in an amount in the range of about 50% to about 75% by total mass of the polymer concrete composition.

Embodiment B: A method comprising: mixing a ready-mixed polymer concrete composition comprising: a thermoset polymer in an amount in the range of about 0.1% to about 10% by total mass of the polymer concrete composition; a supplemental polymer in an amount in the range of about 0.1% to about 5% by total mass of the polymer concrete composition, wherein the supplemental polymer is a water-based surface-stabilized styrene-butadiene copolymer or a water-based styrene-butadiene copolymer; coarse aggregates in an amount in the range of about 50% to about 75% by total mass of the polymer concrete composition; fine aggregates in an amount in the range of about 10% to about 40% by total mass of the polymer concrete composition; recycled plastic filler material in an amount in the range of about 0.1% to about 10% by total mass of the polymer concrete composition, wherein the recycled plastic filler material is selected from the group consisting of recycled polyethylene, recycled polycarbonate, and any combination thereof; and a shrinkage control agent in an amount in the range of about 0.1% to about 1% by total mass of the polymer concrete composition; and curing the ready-mixed polymer concrete composition by adding a hardener in an amount in the range of about 50% to about 75% by total mass of the polymer concrete composition.

Embodiment C: A polymer mortar composition comprising: a thermoset polymer in an amount in the range of about 0.1% to about 10% by total mass of the polymer mortar composition; a supplemental polymer in an amount in the range of about 0.1% to about 5% by total mass of the polymer mortar composition, wherein the supplemental polymer is a water-based surface-stabilized styrene-butadiene copolymer or a water-based styrene-butadiene copolymer; fine aggregates in an amount in the range of about 10% to about 40% by total mass of the polymer mortar composition; recycled plastic filler material in an amount in the range of about 0.1% to about 10% by total mass of the polymer mortar composition, wherein the recycled plastic filler material is selected from the group consisting of recycled polyethylene, recycled polycarbonate, and any combination thereof; a shrinkage control agent in an amount in the range of about 0.1% to about 1% by total mass of the polymer mortar composition; and a hardener in an amount in the range of about 50% to about 75% by total mass of the polymer mortar composition.

Embodiment D: A method comprising: mixing a ready-mixed polymer mortar composition comprising: a thermoset polymer in an amount in the range of about 0.1% to about 10% by total mass of the polymer mortar composition; a supplemental polymer in an amount in the range of about 0.1% to about 5% by total mass of the polymer mortar composition, wherein the supplemental polymer is a water-based surface-stabilized styrene-butadiene copolymer or a water-based styrene-butadiene copolymer; fine aggregates in an amount in the range of about 10% to about 40% by total mass of the polymer mortar composition; recycled plastic filler material in an amount in the range of about 0.1% to about 10% by total mass of the polymer mortar composition, wherein the recycled plastic filler material is selected from the group consisting of recycled polyethylene, recycled polycarbonate, and any combination thereof; and a shrinkage control agent in an amount in the range of about 0.1% to about 1% by total mass of the polymer mortar composition; and curing the ready-mixed polymer mortar composition by adding a hardener in an amount in the range of about 50% to about 75% by total mass of the polymer mortar composition.

Embodiment A, B, C, or D may have one or more of the following additional elements, as outlined below:

Element 1: wherein the polymer concrete composition has a compressive strength in the range of about 3,000 PSI to about 16,000 PSI.

Element 2: wherein the polymer concrete composition has a linear drying shrinkage in the range of about 0.01% to about 0.065%.

Element 3: wherein the polymer concrete composition has an average density in the range of about 2,000 kg/m³ to about 4,000 kg/m³.

Element 4: wherein the thermoset polymer is selected from the group consisting of an epoxy resin, a vinyl ester, a polyester, a furan polymer, and any combination thereof.

Element 5: wherein the thermoset polymer is an epoxy resin based on bisphenol A.

Element 6: wherein the supplemental polymer is a water-based surface-stabilized styrene-butadiene copolymer.

Element 7: wherein the supplemental polymer is a water-based styrene-butadiene copolymer.

Element 8: wherein the coarse aggregates are mineral aggregates selected from the group consisting of sand, dune sand, river sand, quarry dust, crushed quarry rock, gravel, silica, gravel, limestone, calcium carbonate, cinder, calcareous rock, granite, clay, quartz, stone, sand, phosphorous gypsum, and any combination thereof.

Element 9: wherein the coarse aggregates have an average diameter in the range of greater than about 5 mm to about 20 mm.

Element 10: wherein the fine aggregates are mineral aggregates selected from the group consisting of sand, dune sand, river sand, quarry dust, crushed quarry rock, gravel, silica, gravel, limestone, calcium carbonate, cinder, calcareous rock, granite, clay, quartz, stone, sand, phosphorous gypsum, and any combination thereof.

Element 11: wherein the fine aggregates have an average diameter in the range of about 1 mm to about 5 mm.

Element 12: wherein the shrinkage control agent is selected from the group consisting of a methyl methacrylate polymer, a polyalkyl methacrylate polymer, a saturated aliphatic polyester, and any combination thereof.

Element 13: wherein the shrinkage control agent is a methyl methacrylate polymer.

Element 14: wherein the hardener is selected from the group consisting of an amine-based compound, a polymercaptan compound, a polyamide compound, an amidoamine compound, a phenalkamine compound, and any combination thereof.

Element 15: wherein the hardener is tetra-amine 3-ethylene.

Element 16: further comprising a fire retardant agent in an amount in the range of about 2% to about 5% by total mass of the polymer concrete or mortar composition, the fire retardant agent selected from the group consisting of a polysulfone, polyphenylene sulfide, a polyetherketone, a fluoropolymer, a carbide derivative, ammonium polyphosphate, melamine polyphosphate, and any combination thereof.

Element 17: wherein a portion of one or both the coarse aggregates or fine aggregates are derived from construction waste, demolition waste, and any combination thereof.

By way of non-limiting example, exemplary combinations applicable to A include any one, more, or all of Elements 1-17.

By way of non-limiting example, exemplary combinations applicable to B include any one, more, or all of Elements 1-17 in non-limiting combination with the following Element 18:

Element 18: wherein the mixing of the ready-mixed polymer concrete or mortar composition is performed at ambient temperature and the curing of the ready-mixed polymer concrete or mortar composition is performed at atmospheric conditions.

By way of non-limiting example, exemplary combinations applicable to C include any one, more, or all of Elements 4-7 and 10-17.

By way of non-limiting example, exemplary combinations applicable to D include any one, more, or all of Elements 4-7 and 10-18.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second."

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A polymer concrete composition comprising:
a thermoset polymer in an amount in the range of about 0.1% to about 10% by total mass of the polymer concrete composition;
a supplemental polymer in an amount in the range of about 0.1% to about 5% by total mass of the polymer concrete composition,
wherein the supplemental polymer is a water-based surface-stabilized styrene-butadiene copolymer;
coarse aggregates in an amount in the range of about 50% to about 54% by total mass of the polymer concrete composition;
fine aggregates in an amount in the range of about 10% by total mass of the polymer concrete composition;
recycled plastic filler material in an amount in the range of about 0.1% to about 10% by total mass of the polymer concrete composition,
wherein the recycled plastic filler material is selected from the group consisting of recycled polyethylene, recycled polycarbonate, and any combination thereof;
a shrinkage control agent in an amount in the range of about 0.1% to about 1% by total mass of the polymer concrete composition; and
a hardener in an amount in the range of about 10% by total mass of the polymer concrete composition.

2. The polymer concrete composition of claim 1, wherein the polymer concrete composition has a compressive strength in the range of about 3,000 PSI to about 16,000 PSI.

3. The polymer concrete composition of claim 1, wherein the polymer concrete composition has a linear drying shrinkage in the range of about 0.01% to about 0.065%.

4. The polymer concrete composition of claim 1, wherein the polymer concrete composition has an average density in the range of about 2,000 kg/m³ to about 4,000 kg/m³.

5. The polymer concrete composition of claim 1, wherein the thermoset polymer is selected from the group consisting of an epoxy resin, a vinyl ester, a polyester, a furan polymer, and any combination thereof.

6. The polymer concrete composition of claim 1, wherein the thermoset polymer is an epoxy resin based on bisphenol A.

7. The polymer concrete composition of claim 1, wherein the supplemental polymer is a water-based styrene-butadiene copolymer.

8. The polymer concrete composition of claim 1, wherein the coarse aggregates are mineral aggregates selected from the group consisting of sand, dune sand, river sand, quarry dust, crushed quarry rock, gravel, silica, gravel, limestone, calcium carbonate, cinder, calcareous rock, granite, clay, quartz, stone, sand, phosphorous gypsum, and any combination thereof.

9. The polymer concrete composition of claim 1, wherein the coarse aggregates have an average diameter in the range of greater than about 5 mm to about 20 mm.

10. The polymer concrete composition of claim 1, wherein the fine aggregates are mineral aggregates selected from the group consisting of sand, dune sand, river sand, quarry dust, crushed quarry rock, gravel, silica, gravel, limestone, calcium carbonate, cinder, calcareous rock, granite, clay, quartz, stone, sand, phosphorous gypsum, and any combination thereof.

11. The polymer concrete composition of claim 1, wherein the fine aggregates have an average diameter in the range of about 1 mm to about 5 mm.

12. The polymer concrete composition of claim 1, wherein the shrinkage control agent is selected from the group consisting of a methyl methacrylate polymer, a poly-alkyl methacrylate polymer, a saturated aliphatic polyester, and any combination thereof.

13. The polymer concrete of claim 1, wherein the shrinkage control agent is a methyl methacrylate polymer.

14. The polymer concrete composition of claim 1, wherein the hardener is selected from the group consisting of an amine-based compound, a polymercaptan compound, a polyamide compound, an amidoamine compound, a phenalkamine compound, and any combination thereof.

15. The polymer concrete composition of claim 1, wherein the hardener is tetra-amine 3-ethylene.

16. The polymer concrete composition of claim 1, further comprising a fire retardant agent in an amount in the range of about 2% to about 5% by total mass of the polymer concrete composition, the fire retardant agent selected from the group consisting of a polysulfone, polyphenylene sulfide, a polyetherketone, a fluoropolymer, a carbide derivative, ammonium polyphosphate, melamine polyphosphate, and any combination thereof.

17. The polymer concrete composition of claim 1, wherein a portion of one or both the coarse aggregates or fine aggregates are derived from construction waste, demolition waste, and any combination thereof.

18. A method comprising:
    mixing a ready-mixed polymer concrete composition comprising:
        a thermoset polymer in an amount in the range of about 0.1% to about 10% by total mass of the polymer concrete composition;
        a supplemental polymer in an amount in the range of about 0.1% to about 5% by total mass of the polymer concrete composition,
            wherein the supplemental polymer is a water-based surface-stabilized styrene-butadiene copolymer;
        coarse aggregates in an amount in the range of about 50% to about 54% by total mass of the polymer concrete composition;
        fine aggregates in an amount in the range of about 10% by total mass of the polymer concrete composition;
        recycled plastic filler material in an amount in the range of about 0.1% to about 10% by total mass of the polymer concrete composition,
            wherein the recycled plastic filler material is selected from the group consisting of recycled polyethylene, recycled polycarbonate, and any combination thereof; and
        a shrinkage control agent in an amount in the range of about 0.1% to about 1% by total mass of the polymer concrete composition; and
    curing the ready-mixed polymer concrete composition by adding a hardener in an amount in the range of about 10% by total mass of the polymer concrete composition.

19. The method of claim 1, wherein the mixing of the ready-mixed polymer concrete composition is performed at ambient temperature and the curing of the ready-mixed polymer concrete composition is performed at atmospheric conditions.

* * * * *